United States Patent
Czachor, Jr. et al.

(10) Patent No.: US 8,548,149 B2
(45) Date of Patent: Oct. 1, 2013

(54) SYSTEM AND METHOD EMPLOYED BY ANSWERING SERVICE TO DYNAMICALLY SHIELD AGAINST UNWANTED TELEPHONIC CONTACT ATTEMPTS

(75) Inventors: Martin Czachor, Jr., Newtown Square, PA (US); Kevin Czachor, West Chester, PA (US); Norman Franke, Garnet Valley, PA (US)

(73) Assignee: ASD Inc., Media, PA (US)

( * ) Notice: Subject to any disclaimer, the term of this patent is extended or adjusted under 35 U.S.C. 154(b) by 68 days.

(21) Appl. No.: 13/227,894

(22) Filed: Sep. 8, 2011

(65) Prior Publication Data

US 2012/0321064 A1 Dec. 20, 2012

Related U.S. Application Data

(60) Provisional application No. 61/497,970, filed on Jun. 17, 2011.

(51) Int. Cl.
*H04M 3/42* (2006.01)

(52) U.S. Cl.
USPC .................... 379/210.02; 379/214.01

(58) Field of Classification Search
USPC .......... 379/196, 197, 201.01, 201.02, 210.02, 379/210.03, 214.01
See application file for complete search history.

(56) References Cited

U.S. PATENT DOCUMENTS

2007/0143422 A1* 6/2007 Cai .............................. 709/206
2010/0278325 A1* 11/2010 Singh et al. ............. 379/210.02

* cited by examiner

*Primary Examiner* — Antim Shah
(74) *Attorney, Agent, or Firm* — Law Offices of Steven H. Meyer, LLC (57) ABSTRACT

An answering service answers calls on behalf of called parties when callers place incoming calls to the called parties and the called parties are unable or unwilling to answer the incoming calls directly. A dynamic shield is employed to detect and respond to unwanted ("junk") calls from nuisance callers. The dynamic shield includes: a detection module that detects patterns from calls received at the answering service and, for each of one or more nuisance callers, identifies the nuisance caller from the detected patterns; a database module within which the detection module creates and stores a caller record corresponding to the identified nuisance caller; and a shield module operating with reference to the caller record in the database module to screen out further junk calls from the identified nuisance caller.

14 Claims, 6 Drawing Sheets

---

DETECTION MODULE 32 – REVIEW CALL RECORDS IN DATABASE 28 W/O REGARD TO PARTICULAR CALLED PARTIES 14 – 501

↓

DETERMINE THAT PARTICULAR CALLER 12 IS NUISANCE CALLER 12 – 503

↓

CREATE AND STORE WITHIN DATABASE MODULE 36 CALLER RECORD 38 CORRESPONDING TO DETERMINED NUISANCE CALLER 12 – 505

↓

EXPIRE STALE CALLER RECORD 38 IN DATABASE MODULE 36 – 507

SYSTEM AND METHOD EMPLOYED BY ANSWERING SERVICE TO DYNAMICALLY SHIELD AGAINST UNWANTED TELEPHONIC CONTACT ATTEMPTS

CROSS-REFERENCE TO RELATED APPLICATION

The present application claims priority from U.S. Provisional Pat. Application No. 61/497,970, filed on Jun. 17, 2011, which is hereby incorporated by reference in its entirety.

FIELD

The present disclosure relates to a business organization or the like that provides answering services to clients, such as answering services for doctors, lawyers, funeral directors, servicing representatives, and the like. More particularly, the present disclosure relates to such a business organization that in the course of providing such answering services dynamically recognizes when a single source is attempting to telephonically contact multiple clients of the answering service in an unwanted manner, and thereafter establishes an electronic shield to block the unwanted telephonic contacts from being answered at the service.

BACKGROUND

An age-old and recurring problem is effectuating contact between a party and an entity wishing to call or otherwise contact the party. Perhaps ideally, the contacting entity (hereinafter, 'caller') would place a telephone call or the like to the [called] party, the called party would answer the placed telephone call instantaneously if not within a matter of moments to establish the desired contact, and the caller and called party could communicate regarding some matter of interest. Notably, however, most any called party is not always available to answer all calls instantaneously or even momentarily. For example, the called party simply may not want to answer calls, such as for example if on a vacation or at a family event, among other things, or the called party may be occupied by other matters. Accordingly, it is known that such a called party may employ a business organization that provides answering services or the like (hereinafter, 'an answering service') to answer calls from callers when the called party is not immediately available.

As should be understood, with such an answering service, a call to the called party is forwarded therefrom to the answering service by appropriate means when the called party is not available to answer such call or the like, and the answering service may perform a range of answering duties on behalf of the called party. For example, upon answering the call on behalf of the called party, the answering service may let the caller know when the called party is scheduled to be available, or may collect information so that the called party can return the call at an opportune time. Likewise, the answering service may perform an assessment regarding the nature of the call from the caller and based thereon may perform a range of actions. Thus, the answering service may determine that a relatively more serious matter requires more immediate action from the called party, in which case the answering service may attempt to contact the called party as soon as possible by appropriate means. Correspondingly, the answering service may determine that a relatively less serious matter requires less immediate action from the called party, in which case the answering service may only create a message for the called party to be collected thereby at a later time.

Notably, the answering service may be compensated, most likely by or on behalf of the called party, based on any of a number of arrangements. For example, the answering service may charge a flat rate for answering calls on behalf of the called party, or may charge a per-call rate for answering each call on behalf of the called party. In addition, the answering service may charge additional fees for additional services provided, may charge extra fees if answering a particular call is deemed particularly complex or noteworthy, may charge a reduced fee if an answered call is addressed relatively easily, and/or the like.

It is to be understood that in at least some situations, an answering service acts not only to answer calls on behalf of a called party, but also as a buffer or shield between the called party and at least some callers. In doing so, for example, if the caller is determined to be a friend or relative or the like of the called party, the answering service may handle the caller in a more favorable manner. Likewise, if the caller is determined to be a business acquaintance or potential business acquaintance or the like of the called party, the answering service may also handle the caller in a more favorable manner. Conversely, if the caller is determined to be a stranger or a person acting in an unfriendly manner to the called party or the like, the answering service may handle the caller in a less favorable manner. Likewise, if the caller is determined to be an unwanted salesperson, a telemarketer, an entity deemed to be potentially dangerous, or the like, the answering service may also handle the caller in a less favorable manner. As should be understood, then, the answering service is the initial public face of the called party to the caller, and can act on behalf of the called party to handle at least some less-favored calls (hereinafter 'junk calls') so as to avoid bothering the called party with such junk calls.

Notably, an answering service may focus on a particular core clientele of called parties as clients. For example, one kind of answering service may focus on funeral professionals, including funeral directors and the like, while another kind of answering service may focus on doctors and the like, and yet another kind of answering service may focus on lawyers and the like. As may be appreciated, each such clientele can have specialized answering service needs. For example, a caller to a funeral director may be experiencing the loss of a loved one and therefore the funeral director may require the answering service to act with heightened attentiveness and dignity. Likewise, a caller to a doctor may be suffering from a malady and therefore the doctor may require that the answering service contact such doctor with all deliberate speed. Similarly, a caller to a lawyer may be looking for an initial consultation that could lead to a substantial amount of business for the lawyer, and therefore the lawyer may require the answering service to treat the caller with the utmost respect so as to not give the caller a reason to seek another lawyer.

Typically, upon a particular client engaging an answering service to answer calls therefor, the answering service engages one or more telephone service providers or the like to effectuate forwarding of telephone calls or the like from the particular client to the answering service, particularly in a manner deemed necessary and/or advisable by the particular client. Such engaging and such forwarding services are generally known and need not be set forth herein in any detail other than that which is provided. Generally, the forwarding may occur on any appropriate basis, including the time of day, whether forwarding has been positively engaged or disengaged, whether the particular client has selected a particular call for forwarding, whether a call has rung a predetermined number of times, whether a phone or phone system of the particular client is off, or the like.

Notably, the answering service may answer a call on behalf of a particular client or type of client according to a predetermined procedure or 'script' that has been established for the particular client or type of client. As may be appreciated, the script can be quite involved, and can tend to cover a wide range of subjects, according to the answering needs of the particular client or type of client. Importantly, with the use of such a script, information can be collected from a particular caller calling a particular called party according to the script and entered into an appropriate database or the like for later retrieval and use, as is generally known.

Typically, the answering service would, based on such a script, collect all information as dictated according to the script, then would terminate the call, perhaps with an assurance that the called party would return the call, and then would attempt to contact the called party. Although by no means necessarily, the called party can be contacted by way of a predetermined mobile telephone line, landline telephone line, pager, mobile electronic mail device, desktop electronic mail device, mobile electronic texting device, desktop electronic texting device, or a combination thereof, or the like. Alternately, if the call from the called party is of some urgency, or if the script requires, or the like, the answering service may immediately attempt to contact the called party before the script has ended.

As was alluded to above, certain calls may be classified as junk calls from nuisance callers. More specifically, such nuisance callers may in fact be unwanted salespersons, telemarketers, entities deemed to be potentially dangerous, or the like, where such certain callers/nuisance callers are likely not welcome. At least some attempts have been made to regulate such nuisance callers and/or prevent such junk calls. Nevertheless, nuisance callers and junk calls have not disappeared, and in fact such nuisance callers have become more clever in devising ways to issue forth their junk calls.

In one particular scenario, a nuisance caller may target a particular group of individuals or other entities for a sales pitch by collecting data regarding the entities of the particular group, including a telephone number corresponding to each such entity. For example, if a nuisance caller wishes to sell a particular good or service to funeral directors, the nuisance caller may obtain the telephone number for each and every funeral director, perhaps in a particular region or even over the entire country. Based thereon, then, the nuisance caller would typically employ automated equipment to dial each telephone number so as to call the corresponding funeral director/called party, and for each answered call the automated equipment may then connect the answered call to an associate who would then attempt to deliver the sales pitch and thereby sell some product or service.

Typically, most if not all called parties, be they funeral directors or otherwise, have no interest whatsoever in the sales pitch from the nuisance caller. Hence, the call from the nuisance caller would generally be considered to be an aforementioned junk call. As is generally known, then, a called party almost never appreciates receiving such a junk call, and in fact many called parties go to great lengths to avoid receiving such junk calls. In particular, many called parties sign up on various do-not-call lists, screen calls, and/or employ caller identification services among other things in an effort to avoid receiving such junk calls.

Notably, if a particular called party employs an aforementioned answering service, the answering service may screen calls on behalf of the called party to prevent the called party from receiving junk calls. However, if the nuisance caller is continuously placing junk calls to multiple called parties, and the multiple called parties all employ the same answering service, such answering service may become overwhelmed by answering all the junk calls from the nuisance caller for the multiple called parties that employ such answering service. Moreover, if the answering service charges a particular called party employed thereby on a per call basis, and if the nuisance caller repeatedly places junk calls to the particular called party, the repeatedly placed junk calls may result in such particular called party owing a substantial amount of money to the answering service for the answered junk calls.

Accordingly, a need exists for a system and method for allowing an answering service to detect and respond to so-called junk calls from so-called nuisance callers. In particular, a need exists for such a system and method that dynamically shields against such junk calls from a nuisance caller to called parties that all employ the same answering service. Specifically, a need exists for such a system and method where the answering service detects multiple incoming calls from a particular caller within a specific time period and based thereon identifies the particular caller as a nuisance caller issuing forth junk calls, and thereafter flags calls from the nuisance caller for special handling. Accordingly, the answering service need not expend further efforts to deal with the junk calls and the clients of the answering service are not charged thereby for dealing with the junk calls.

SUMMARY

The aforementioned needs are satisfied by a system and method performed by an answering service that answers calls on behalf of called parties when callers place incoming calls to the called parties and the called parties are unable or unwilling to answer the incoming calls directly. A dynamic shield is employed to detect and respond to unwanted ("junk") calls from nuisance callers. The dynamic shield includes: a detection module that detects patterns from calls received at the answering service and, for each of one or more nuisance callers, identifies the nuisance caller from the detected patterns; a database module within which the detection module creates and stores a caller record corresponding to the identified nuisance caller; and a shield module operating with reference to the caller record in the database module to screen out further junk calls from the identified nuisance caller.

The detection module reviews call records to the called parties without regard to particular ones of the called parties according to at least one of an algorithm and a heuristic to detect a pattern of junk calls from a nuisance caller. Based on the review, the detection module determines that a particular caller is a nuisance caller and creates and stores within the database module a caller record corresponding to the determined nuisance caller.

The shield module for each incoming call from a caller obtains an identifier for the caller and employs the obtained identifier to index into the caller record in the database module. Upon finding the obtained identifier in the caller record in the database module, the shield module presumes that the call is a junk call and the caller is a nuisance caller, and rejects the presumed junk call and prevents the rejected call from being answered by an agent or the like.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

EXAMPLE COMPUTING ENVIRONMENT

Figure 1:
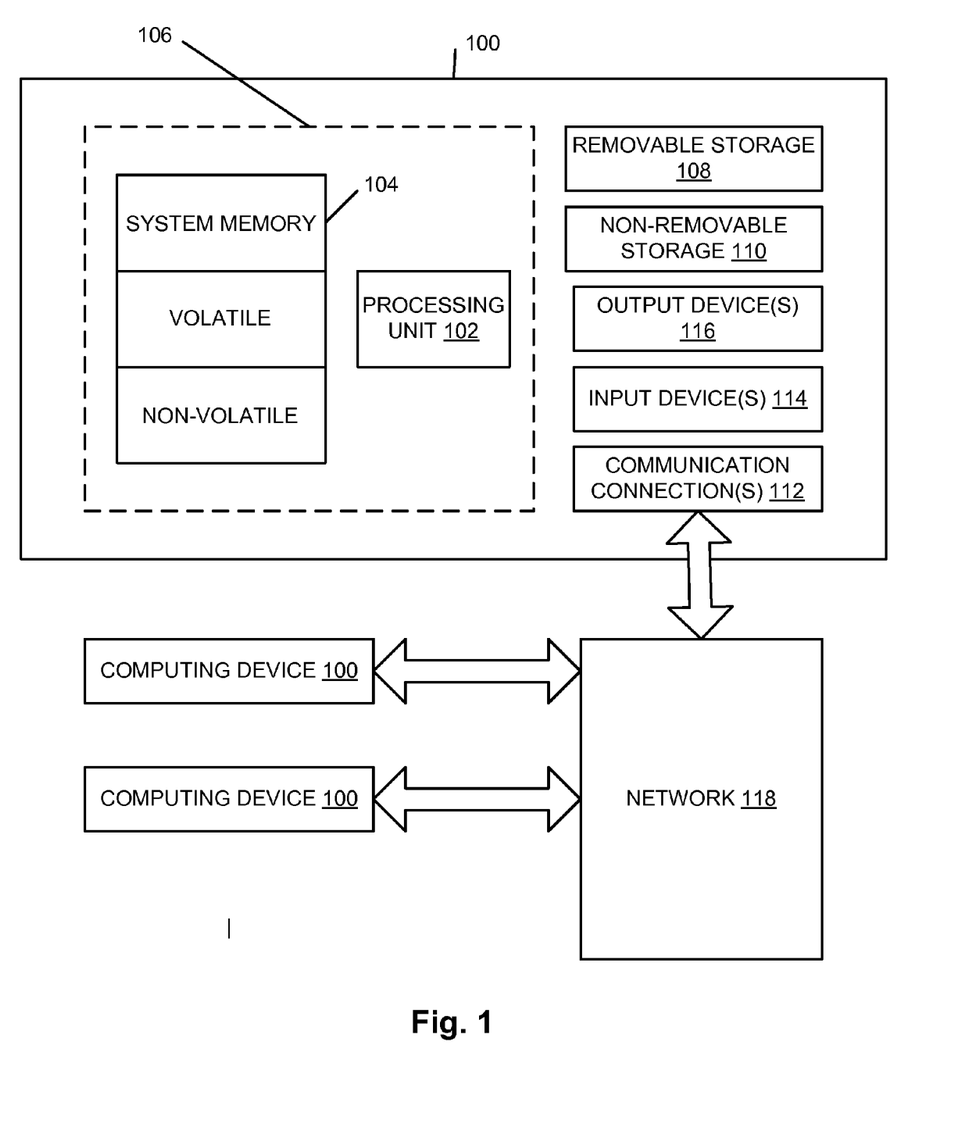
FIG. 1 is a block diagram of an example of a computing environment within which various embodiments of the present innovation may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, so-called thumb drives and/or flash drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Called Party Answering Service

Figure 2:
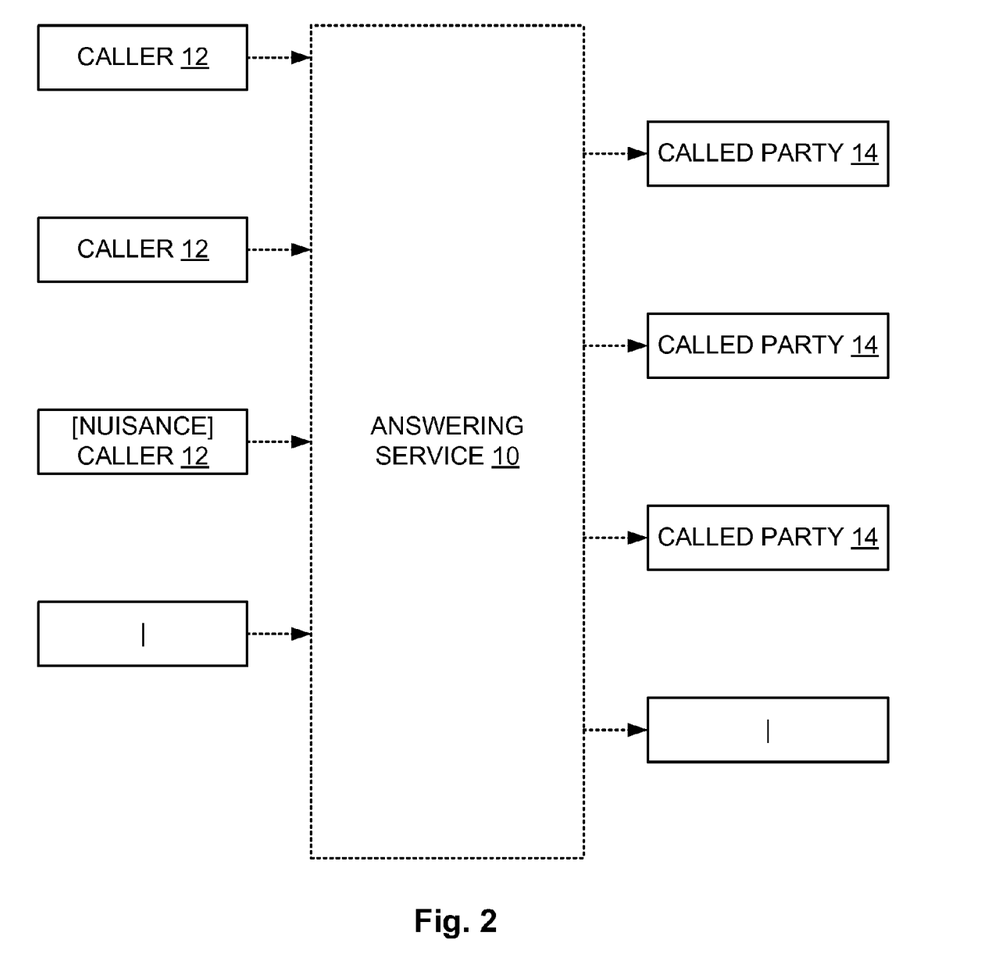
FIG. 2 is a block diagram showing a called party answering service provided to answer calls or the like from clients to called parties or the like in the event that the called parties are not willing or able to answer the calls.

Turning now to FIG. 2, it is seen that a called party answering service 10 is provided to answer each of one or more calls or the like from each of one or more callers 12 or the like to each of one or more called parties 14 or the like in the event that a particular called party 14 is not willing or able to answer a particular call from a particular caller 12. Typically, although not necessarily, the answering service 10 is operated by a business organization that provides answering services or the like on behalf of multiple called parties 14. As was alluded to above, each caller 12 and each called party 14 may be any appropriate respective client and called party without departing from the spirit and scope of the present innovation. Thus it may be that a particular called party 14 is a doctor, a lawyer, a service called party, a funeral director, or the like, among other things, and a particular caller 12 calling to the called party 14 may require the called party services thereof, perhaps on an urgent basis.

Likewise, the reason why the called party 14 does not answer a particular call may be most any reason without departing from the spirit and scope of the present innovation. For example, the called party 14 simply may not want to answer calls, such as for example if on a vacation or at a family event, among other things, or the called party 14 may be otherwise occupied by called party matters.

Presumptively, the call to the called party 14 from the caller 12 is of a telephonic nature, at least for purposes of disclosing the present innovation in the present disclosure. Thus, it may be that the caller 12 is employing a landline telephone or a mobile telephone (a device 100 of FIG. 1, e.g.), and is calling to a landline telephone or mobile telephone of the called party 14 (also a device 100 of FIG. 1, e.g.). Notably, though, the call to the called party 14 from the caller 12 could be of some other nature without departing from the spirit and scope of the present innovation. For example, it may be that the caller 12 is employing a digital electronic mail device or a digital texting device (again, a device 100 of FIG. 1, e.g.), and is addressing a digital electronic mail device or a digital texting device (once again, a device 100 of FIG. 1, e.g.) of the called party 14.

Particularly in the case where the call is telephonic in nature, and as seen in FIG. 2, the call from the caller 12 to the called party 14 is forwarded therefrom to the answering service 10 by appropriate means that have already been established in a generally known manner. Typically, and as was alluded to above, upon the called party 14 engaging the answering service 10 to answer calls on behalf of such called party 14, the answering service 10 communicates with one or more telephone service providers or the like to effectuate such forwarding. As should be understood, the forwarding may be performed according to any appropriate basis, including the time of day, whether forwarding has been positively engaged or disengaged, whether the business has selected a particular call for forwarding, whether a call has rung a predetermined number of times, whether a phone or phone system of the business is off, or the like. In any case, the call from the caller 12 to the called party 14 is in fact answered by the answering service 10 on behalf of the called party 14.

The answering service 10 may find it particularly convenient, manageable, profitable, and/or otherwise advantageous to focus on a particular segment of called parties 14 when developing a clientele. As should be understood, by focusing on a particular clientele, the answering service 10 may develop special expertise in servicing such particular clientele, and in fact may become highly adept and sought after by such particular clientele. Accordingly it may be that the particular clientele of an answering service 10 may be doctors, lawyers, funeral professionals, pharmaceutical sales personnel, and the like, among others.

As was alluded to above, it is expected that the answering service 10 is compensated by or on behalf of the called party 14, although other sources of compensation may also exist. Forms of such compensation are varied, but generally include a flat rate for answering calls on behalf of the called party 14, a series of such flat rates based on tiers of volume of answered calls, and a per-call rate for answering each call on behalf of the called party 14, among others. In addition or alternately, the answering service 10 may charge a fee for each answered call based on complexity, based on the time spent answering the call, and the like, among others. Generally, though, the answering service 10 may expect to receive and the called party 14 may be expected to provided more fees as the volume and complexity of calls to the called party 14 increases.

Inasmuch as the answering service 10 is effectively an intermediary between a called party 14 and callers 12 thereto, the answering service 10 may be expected to act as a buffer or shield between the called party 14 and at least some of such callers 12. With particular relevance to the present disclosure, then, it is to be understood that the answering service 10 may be expected to shield the called party 14 from less-favored calls (hereinafter 'junk calls') so as to avoid bothering the called party 14 with such junk calls. Thus, if a caller 12 is determined to be acting in an unfriendly manner to the called party 14, the answering service 10 should prevent the unfriendly caller 12 from reaching the called party 14. Likewise, if a caller 12 is determined to be undesirable to the called party 14, such as an unwanted salesperson or a telemarketer, the answering service 10 should also prevent the undesirable caller 12 from reaching the called party 14. As should be understood, then, the answering service 10 may be empowered to act on behalf of the called party 14 to handle at least some junk calls by blocking same. Thus, the attention of the called party 14 is not disturbed by such blocked junk calls and may instead be devoted to more significant pursuits.

Answering Process

Figure 3:
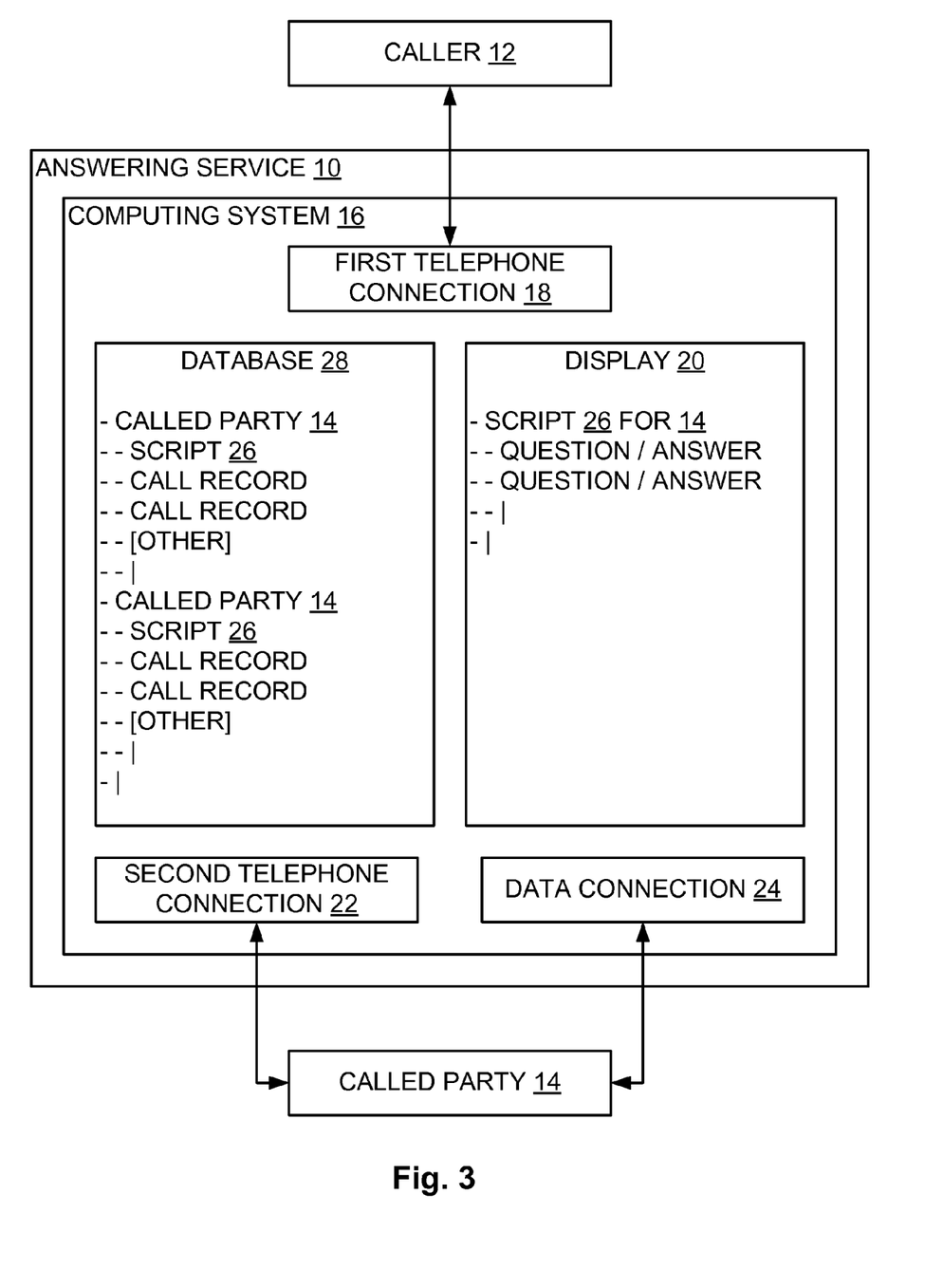
FIG. 3 is a block diagram of a computing system employed to answer a call from the client of FIG. 2 to the called party of FIG. 2 as forwarded to the answering service of FIG. 2 in accordance with various embodiments of the present innovation.

Turning now to FIG. 3, it is to be understood that a call from a caller 12 to a called party 14 as forwarded to an answering service 10 may be answered by an individual agent associated with the answering service 10 with the use of a computing system 16 instantiated by or on behalf of the answering service 10. As should be appreciated, the computing system 16 may be in the nature of one or more of the computing devices 100 of FIG. 1. Such a computing system 16 is generally known or should be apparent, and therefore need not be set forth herein in any detail other than that which is provided.

Thus, the computing system 16 may be any appropriate computing system 16 that provides the functionality necessary to achieve the actions set forth herein. Here, it is to be appreciated that the computing system 16 may among other things include a first telephone connection 18 or the like for receiving the forwarded call from the client 10, a display 20 or the like upon which is shown various items to the agent, a second telephone connection 22 or the like for outgoing calls and automated voicemail dispatches or the like, and a data connection 24 or the like for outgoing data messages or the like, perhaps in the nature of electronic mail or a text message as will be set forth in more detail below.

As was noted above, the agent at the computing system 16 of the answering service 10 may answer a particular forwarded call from a client 10 on behalf of a particular called party 14 according to a predetermined procedure or 'script' 26 that has been established for the particular called party 14. Typically, as an initial matter the particular call is received on the first telephone connection 18 of the computing system 16, is identified by the system 16 as being for a particular called party 14, and based thereon the system 16 obtains and runs the corresponding script 26, perhaps from a local or remote database 28 (FIG. 3). As may be appreciated, the system may identify the particular called party 14 for the forwarded call based on a caller ID, DNIS (Dialed Number Identification System), or other information associated with the forwarded call. Such identifying is known or should be apparent to the relevant public and therefore need not be set forth herein in any detail other than that which is provided.

At some point, the agent based on such a script 26 may decide to attempt to contact the called party 14 based on the particular call. As should be understood, the called party 14 typically can be contacted by way of a predetermined mobile telephone line, landline telephone line, pager, mobile electronic mail device, desktop electronic mail device, mobile electronic texting device, desktop electronic texting device, or a combination thereof, or the like. Upon contacting the called party 14 or as part of contacting the called party 14, then, the agent would transmit thereto at least some information relating to the particular call, where the information was likely collected according to the corresponding script 26. As may be appreciated, the information may include the nature of the particular call and relevant items such as a telephone number by which the called party 14 may contact the caller 12, among other things. Such transmitting may be performed orally by way of the second telephone connection 22 or the like, or electronically by way of the data connection 24 if by way of an electronic message or the like. As may be appreciated, the method of contact/transmission employed may be set forth in the corresponding script 26 or in other information for the called party 14 in the database 28 or the like.

Junk Call Scenario

As was alluded to above, certain calls may be classified as junk calls from nuisance callers. More specifically, such nuisance callers may in fact be unwanted salespersons, telemarketers, entities deemed to be potentially dangerous, or the like, where such certain callers/nuisance callers are likely not welcome. In one particular junk call scenario of especial relevance to the present disclosure, a [nuisance] caller 12 (hereinafter, 'nuisance caller 12') targets a particular group of individuals or other entities for a sales pitch, usually but not necessarily by collecting data regarding the entities of the particular group, including a telephone number corresponding to each such entity.

Thus, a nuisance caller 12 wishing to sell a particular good of likely dubious worth to funeral directors may obtain the telephone number for each and every funeral director, perhaps in a particular region or even over the entire country. Based thereon, then, the nuisance caller 12 would typically employ automated equipment to dial each telephone number so as to call the corresponding funeral director/called party 14, and for each answered call the automated equipment may then connect the answered call to an associate who would then attempt to deliver the sales pitch and thereby sell the dubious good. Similarly, a nuisance caller 12 wishing to deliver an offensive political message to all doctors in a particular region may obtain the telephone number for each and every doctor, and would likewise employ automated equipment to dial each telephone number so as to call the corresponding doctor/called party 14. For each answered call the automated equipment may here play back a recording of the offensive message.

Typically, most if not all called parties 14, be they funeral directors, doctors, accountants, homeowners, or otherwise, have no interest whatsoever in the sales pitch or message from the nuisance caller 12. Hence, the call from the nuisance caller 12 would generally be considered to be an aforementioned junk call. As is generally known, then, a called party 14 almost never appreciates receiving such a junk call, and in fact many called parties 14 go to great lengths to avoid being bothered by junk calls.

With particular relevance to the present disclosure, if a particular called party 14 employs the answering service 10, such answering service 10 may among other things screen calls on behalf of the called party 14 to prevent same from receiving junk calls. Note, though, that if a nuisance caller 12 is continuously placing junk calls to multiple called parties 14, and the multiple called parties 14 all employ the same answering service 10, such answering service 10 may become overwhelmed by answering all the junk calls from the nuisance caller 12 for the multiple called parties 14 that employ such answering service 10. Anecdotally, it has been known that a single answering service 10 can receive 20 junk calls per minute from the automated dialing equipment of a single nuisance caller 12, and even 450 junk calls per minute from automated dialing equipment is not unheard of. Accordingly, the issue of junk calls from a nuisance caller 12 is more than theoretical, and has real consequences.

Chief among those consequences is that each junk call as answered by the answering service 10 can incur a charge to the called party 14. As should be understood, then, if the answering service 10 charges a particular called party 14 employed thereby on a per call basis, and if the nuisance caller 12 repeatedly places junk calls to the particular called party 14, the repeatedly placed junk calls may result in such particular called party 14 owing a substantial amount of money to the answering service 10 for the answered junk calls.

Dynamic Shield Against Junk Calls

Figure 4:
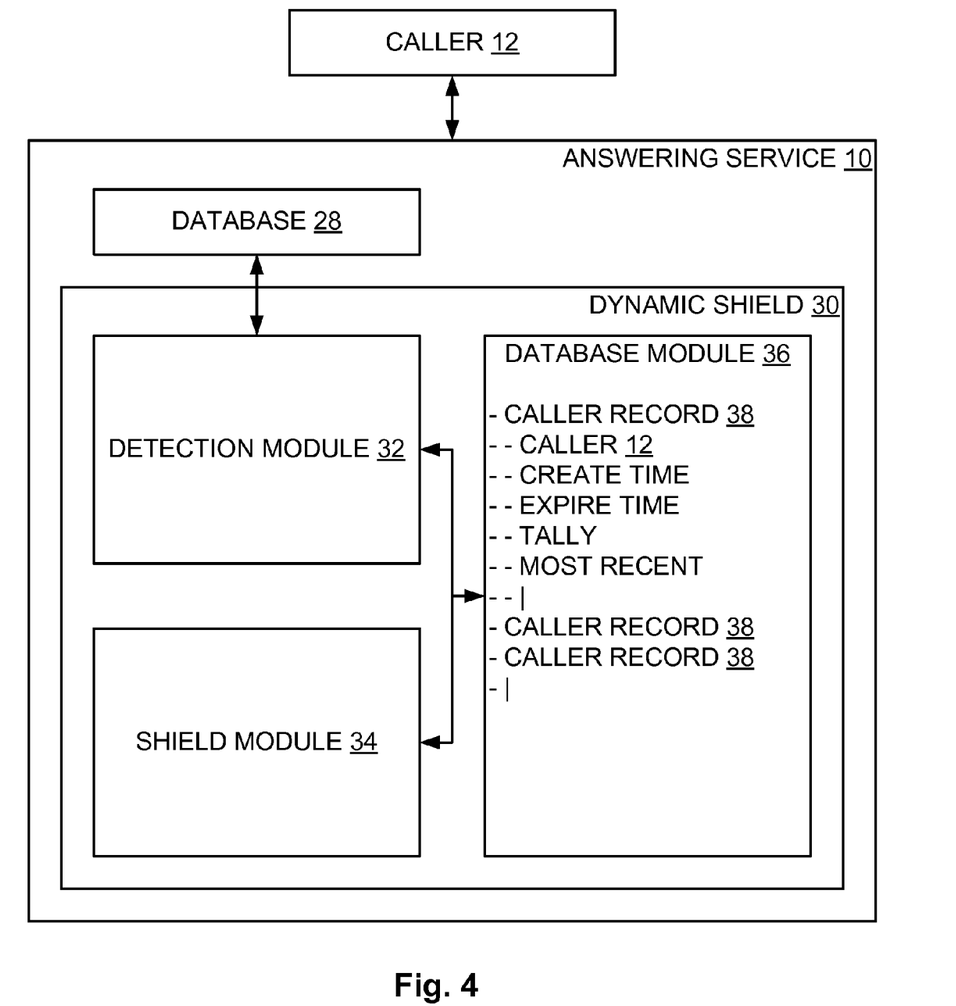
FIG. 4 is a block diagram of a dynamic shield employed in the system of FIG. 3 to block and reject unwanted junk calls from nuisance callers in accordance with various embodiments of the present innovation.

Accordingly, the present disclosure sets forth a dynamic shield 30 (FIG. 4) that is employed by the answering service 10 to detect and respond to so-called junk calls from so-called nuisance callers 12. As seen in FIG. 4, the dynamic shield 30 in pertinent part includes a detection module 32, a shield module 34, and a database module 36, among other things. As may be appreciated, such modules 32, 34, 36 may be instantiated as hardware employed by or on behalf of the answering service 10, as software instantiated on hardware employed by or on behalf of the answering service 10, or a combination thereof.

The detection module 32 operates to detect patterns from calls received at the answering service 10 and, for each of one or more nuisance callers 12, to identify the nuisance caller 12 from the detected patterns. As may be appreciated, the detected patterns may be any appropriate patterns representative of junk calls from the nuisance caller 12, and may be defined according to rules or parameters established by the answering service 10. For example, a nuisance caller 12 may originate a certain number of calls to the answering service 10 within a set period of time, or may originate a certain number of calls to the answering service 10 which have been identified as junk calls, among other things.

As should be understood, inasmuch as the detection module 32 operates by detecting such patterns over multiple received calls at the answering service 10, the detection module 32 is not necessarily an instantaneous detector of junk calls. Instead, it may take some amount of time before a pattern of junk calls is detected and a nuisance caller is identified from the detected pattern of junk calls. Note, though, that inasmuch as junk calls can be originated by a nuisance caller 12 at rates of 20 per minute or even much more, the detection module 32 can be expected to identify such a nuisance caller 12 relatively quickly, especially in more egregious cases.

Typically, the detection module 32 may be expected to continuously or nearly continuously review calls from callers 12 as received at the answering service 10. Accordingly, the detection module 32 may be expected to have access to data corresponding to such received calls. In at least some circumstances, such data may be available from the database 28 (FIG. 3). In particular, and as seen in FIG. 3, it may be that the database 28 includes for each call received for a called party 14 a call record related to the call, where the call record includes, among other things, an identification of the corresponding caller 12 (a telephone number, for example), a time the call was received, and a resolution of the call. Note, though, that such call records may be located elsewhere.

As should be appreciated, the identification of the caller 12 as set forth in each call record may be obtained in any of several known fashions. For example, the identification may be that which was provided by a caller ID service or by a DNIS (Dialed Number Identification Service). As should also be appreciated, the resolution of each call as set forth in each call record may be of especial interest to the detection module 32. That is to say, while the detection module 32 may have less interest in calls that were successfully answered and dealt with, such detection module may have more interest in calls that were flagged by agents as from nuisance callers, calls that were flagged as not found to have live callers 12 (either by automated detection or by being flagged as such by agents), calls that were flagged as found to have abusive or non-cooperative callers 12, or the like, any of which may be considered indications that a caller 12 is a nuisance caller 12.

In various embodiments, the detection module 32 reviews the call records in the database 28 without regard to the particular called parties 14 (501, FIG. 5), perhaps according to a set algorithm, in order to detect a pattern of junk calls from a nuisance caller 12. As should be appreciated, such a set algorithm as employed by the detection module 32 may be most any appropriate algorithm. As but one example, it may be that the detection module 32 operates over a rolling window of some period of time, such as for example the last minute, ten minutes, or hour, or the like, and examines the call records in the database 28 for all received calls within the rolling window. Further, it may be that the detection module 32 considers only those call records within the window that have a non-positive resolution (i.e., were flagged or otherwise noted as likely being from a nuisance caller 12). Moreover, it may be that the detection module 32 only identifies a caller 12 as being a nuisance caller 12 if the caller 12 appears within a set number of the considered call records, perhaps ten or twenty or so, and perhaps if the nuisance caller 12 has called more than a minimum number of different called parties 14, perhaps five or so.

Figure 5:
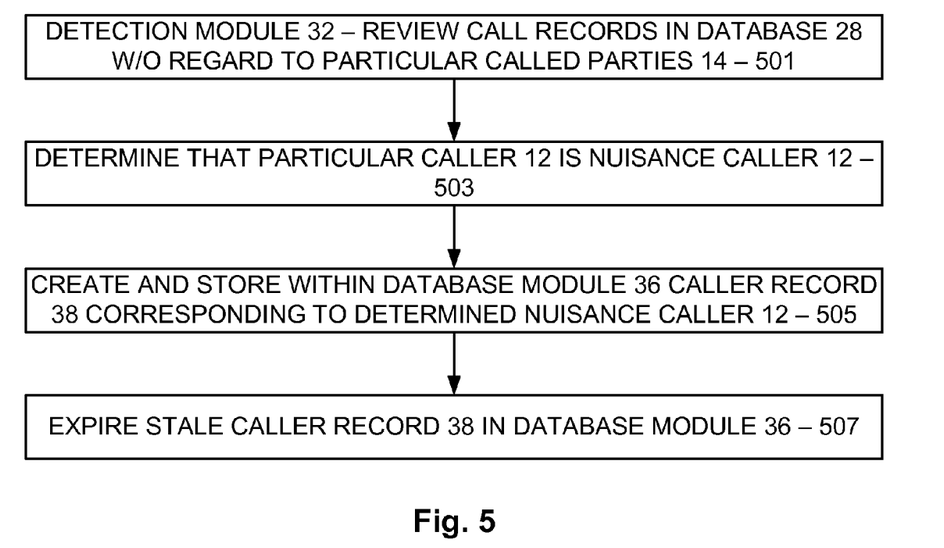
FIGS. 5 and 6 are flow diagrams showing actions performed by the dynamic shield of FIG. 4 in accordance with various embodiments of the present innovation.

In other various embodiments, the detection module 32 reviews the call records in the database 28 without regard to the particular called parties 14 as at 501, but according to a non-algorithmic set of heuristics in order to detect a pattern of junk calls from a nuisance caller 12. As should be appreciated, such non-algorithmic heuristics are by their nature less formalistic and formulistic, and instead rely on learned behavior that has been accumulated over time. One example of such non-algorithmic heuristics may be a learned appreciation that calls received from a particular geographic locale at a particular time are likely junk calls, while another example may be that calls that are terminated after one minute are likely not junk calls.

In still other embodiments, the detection module 32 reviews the call records in the database 28 according to multiple algorithms, multiple non-algorithmic sets of heuristics, and or a combination thereof. As should be appreciated, particularly inasmuch as nuisance callers 12 can be crafty, it may be necessary to employ multiple defensive techniques in order to detect such nuisance callers 12. Note, though, that the multiple defensive techniques should not be overly inclusive, which is to say that the detection module 32 should not identify a caller as being a nuisance caller 12 if in fact the caller 12 is not a nuisance caller 12.

In any event, once the detection module 32 determines that a particular caller 12 is a nuisance caller 12 (503), the detection module 32 creates and stores within the database module 36 a caller record 38 corresponding to the determined nuisance caller 12 (505). Such a caller record 38 may take any appropriate format, and may for example include an identification of the nuisance caller 12 such as for example a telephone number thereof, a time that the record 38 was created, a time that the record 38 expires, a running tally of calls received from the nuisance caller 12, and a time that a most recent call was received from the nuisance caller 12, among other things. As may be appreciated, at least some of such information may be employed to quickly identify subsequent calls from the nuisance caller 12 and to deal with such subsequent calls as junk calls, as will be set forth in more detail below.

As may also be appreciated, at least some of such information may be employed by the detection module 32 or the like to expire stale caller records 38 in the database module 36 (507). Thus, it may be that a caller record 38 with a time that a most recent call was received from a nuisance caller 12 which is older than, say, one month may likely be safely deleted. In such a case, the nuisance caller 12 has presumably moved on to a different identification, or perhaps has stopped placing junk calls. As should be understood, by expiring stale caller records 38, space may be opened in the database module 36, and also searching within the database module 36 is faster. By expiring a particular stale caller record 38, an associated identifier or the like may then be safely used again, possibly by an entirely different entity, to contact called parties 14.

With the caller records 38 in the database module 36, the shield module 34 operates in the following manner to screen out further junk calls from nuisance callers 12. In particular, and turning now to FIG. 6, each incoming call to the answering service 10 is first examined by the shield module 34 prior to allowing the call to reach an agent or the like of the answering service 10, and prior to billing or otherwise accounting for the call to the called party 14. Accordingly, it should be appreciated that the shield module 34 only allows calls to be answered that are not believed to be junk calls.

In particular, for each incoming call from a caller 12, the shield module 34 first obtains the identifier for the caller 12 (601, FIG. 6), either directly or by way of an identifying service employed by the answering service 10. As was set forth above, such an identifier may be that which was provided by a caller ID service or by a DNIS (Dialed Number Identification Service). The shield module 34 then employs the obtained identifier to index into or otherwise search the caller records 38 in the database module 36 (603). To that end, and for efficiency, it may be advisable to store the caller records 38 in the database module 36 according to the identifier for the caller 12 in each caller record 38.

Figure 6:
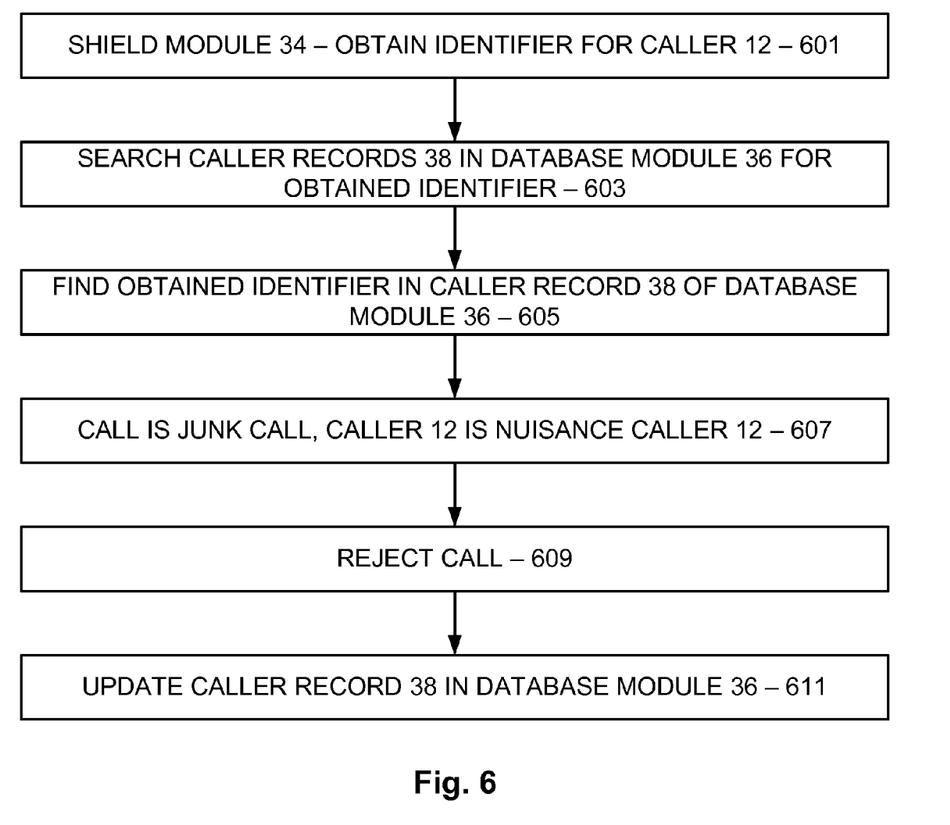

As may be appreciated, if the shield module 34 does not find the obtained identifier in one of the caller records 38 of the database module 36, then the shield module 34 may presume that the call is not a junk call and the caller 12 is not a nuisance caller 12. Conversely, though, if the shield module 34 does in fact find the obtained identifier in one of the caller records 38 of the database module 36 (605), then the shield module 34 may presume that the call is in fact a junk call and the caller 12 is in fact a nuisance caller 12 (607). Accordingly, the shield module 34 rejects the call (609), and prevents the call from being answered by an agent or the like.

In rejecting the call as at 609, it may be that the call has already been answered. In such a case, the shield module 34 may take an appropriate action such as disconnecting the call or playing a rejection message and then disconnecting the call. Note, though, that answering the call may be inadvisable inasmuch as doing so confirms to the nuisance caller 12 that the called party 14 is active. Thus, it may be more advisable for the shield module 34 to perform the action of 601-609 prior to the call being answered, and based only on the obtained identifier. If so, rejecting the call as at 609 may include an instruction from the shield module 34 to the telephone network supplying the call to block such call without answering same. In addition, such a blocking instruction may include a notation that the blocked and unanswered call is to be signaled to the nuisance caller 12 by a fast busy or the like. Such an instruction is known or should be apparent and therefore need not be set forth herein in any detail. As may be appreciated, signaling a fast busy or the like to the nuisance caller 12 implies that the called party 14 is inactive. Thus, the nuisance caller 12 may possibly note in its own records that the called party 14 is inactive, and not direct further junk calls to such called party 14.

Finally, after blocking the junk call, the shield module 34 updates the caller record 38 in the database module 36 from which the obtained identifier was found (611). As may be appreciated, such updating may include but is not limited to incrementing the associated running tally of calls received from the nuisance caller 12, and updating the time that a most recent call was received from the nuisance caller 12, among other things. Thus, and as was set forth above at 507, the detection module 32 can employ such information to expire and delete the updated caller record 38 at some later point if advisable to do so.

Notably, the shield module 34 and the dynamic shield 30 prevent junk calls from being answered by the answering service 10. Accordingly, the answering service 10 is not burdened by having to answer junk calls from a nuisance caller 12, especially in the case where the nuisance caller 12 is effectively broadcasting such junk calls to multiple ones of the called parties 14 serviced by the answering service 10. Thus, the answering service 10 can more effectively allocate its resources to answering non-junk calls from non-nuisance callers 12. Also, the answering service 10 need not bill each called party 14 for answering such junk calls thereto. Thus, each called party 14 is relieved from the burden of paying the answering service 10 to answer such junk calls. Note, though, that the answering service 10 may choose to bill the called party 14 for blocking each junk call thereto, or may choose to bill the called party 14 an alternate fee arrangement for blocking junk calls thereto, perhaps in the manner of a blocking service subscribed to by the called party 14.

Also notably, the dynamic shield 30 is indeed dynamic in that the shield 30 automatically detects nuisance callers 12 from patterns of junk calls therefrom, and automatically shields further junk calls from such detected nuisance callers 12. Thus, intervention on a human level is seldom if ever necessary, except perhaps to define patterns of junk calls, or to adjust for callers 12 mislabeled as nuisance callers 12. In the latter case, and as may be appreciated, it could be that each caller record 38 for such a non-nuisance caller 12 can manually be adjusted to include an appropriate flag or the like, and the shield module 34 can check for the presence of such a flag and if found not reject an associated call.

As thus far set forth herein, the dynamic shield 30 is generally local to an answering service 10 and is used exclusively thereby. Note, though, that at least some portion of the dynamic shield 30 may be remote from the answering service 10, and that the answering service 10 may instead be another type of answering entity, all without departing from the present innovation. For example, the answering service 10 may instead be a corporate or industrial site or other relatively large presence that would be expected to receive many calls including junk calls. Also for example, it may be that the database module 36 is centrally located in a remote location from a plurality of dynamic shields 30 and is shared across such plurality of dynamic shields 30. As should be understood, by doing so, patterns of junk calls may be recognized more quickly, and may be shared across such plurality of dynamic shields 30.

Particularly with regard to sharing a central database module 36 across a plurality of dynamic shields 30, it is to be appreciated that any appropriate architecture and methods of communication may be employed to effectuate such an arrangement without departing from the present innovation. For example, it may be that each dynamic shield 30 at a particular location is interposed between an internal call switching system and an external call line or the like, and includes data communications functionality that allows such dynamic shield 30 to communicate with the central database module 36. As may be appreciated, the data communications functionality may be a dedicated data line or even a generally available Internet connection or the like if judged to have sufficient bandwidth necessary for high speed operation. Such architectures and methods should be apparent to the relevant public from the present innovation, and accordingly need not be set forth herein in any detail other than that which has been provided. Generally, a central database module 36 is accessed by any one of a plurality of dynamic shields 30 in a manner similar to that which was set forth above, perhaps with slight differences necessitated by the database module 36 being remotely located.

CONCLUSION

The programming believed necessary to effectuate the processes performed by the computing system 16 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for providing dynamic shielding against junk calls from a nuisance caller 12 to called parties 14 that all employ the same answering service 10. The answering service 10 detects multiple incoming calls from a particular caller 12 within a specific time period or the like, and based thereon identifies the particular caller 12 as a nuisance caller 12 issuing forth junk calls. Thereafter, the answering service 10 rejects calls from the nuisance caller 12. Accordingly, the answering service 10 need not expend further efforts to deal with the junk calls and the clients/called parties 14 of the answering service 10 are not charged thereby for dealing with the junk calls.

It should be appreciated that changes could be made to the embodiments described above without departing from the innovative concepts thereof. For example, although the present innovation is set forth primarily in terms of telephonic calls or the like as answered by an answering service 10 or the like, such innovation may also be practiced by in connection with any other appropriate type of communications medium and any other appropriate type of answerer, perhaps with suitable modification. Likewise, although the present innovation is set forth with reference to the use of certain types of databases, records, and the like, other such databases, records, and the like may also be employed, perhaps with suitable modification. It should be understood, therefore, that this innovation is not limited to the particular embodiments disclosed, but it is intended to cover modifications within the spirit and scope of the present innovation as defined by the appended claims.

The invention claimed is:

1. A method performed at an answering service, the answering service answering calls on behalf of called parties when callers place incoming calls to the called parties and the called parties are unable or unwilling to answer the incoming calls directly, the method being performed by a computing system of the answering service and comprising:
  employing a dynamic shield to detect and respond to unwanted ("junk") calls from nuisance callers, the dynamic shield including:
    a detection module that detects patterns from calls received at the answering service and, for each of one or more nuisance callers, identifies the nuisance caller from the detected patterns,
    a database module within which the detection module creates and stores a caller record corresponding to the identified nuisance caller, and
    a shield module operating with reference to the caller record in the database module to screen out further junk calls from the identified nuisance caller,
    the shield module operating separately and independently from the detection module and after the detection module has stored the caller record in the database module, the detection module employing information in the caller record to expire such caller record in the database module when such caller record becomes stale,
  the detection module:
    reviewing call records to the called parties without regard to particular ones of the called parties according to at least one of an algorithm and a heuristic to detect a pattern of junk calls from a nuisance caller;
    determining based on the review that a particular caller is a nuisance caller; and creating and storing within the database module a caller record corresponding to the determined nuisance caller, the detection module employing an algorithm that operates over a rolling window having a predetermined period of time, that considers only those call records within the rolling window that have a non-positive resolution, and that identifies a particular caller as being a nuisance caller if the particular caller appears within a set number of the considered call records.

2. The method of claim 1 wherein the call is a telephone call.

3. The method of claim 1 wherein the detected patterns are predetermined patterns representative of junk calls from nuisance callers and defined according to rules established by the answering service.

4. The method of claim 1 wherein the caller record includes an identifier of the nuisance caller, a time that the caller record was created, a time that the caller record expires, a running tally of calls received from the nuisance caller, and a time that a most recent call was received from the nuisance caller.

5. The method of claim 1 wherein the detection module expires the caller record in the database module when a time that a most recent call was received from a nuisance caller as set forth in the caller record is older than a predetermined period of time.

6. A method performed at an answering service, the answering service answering calls on behalf of called parties when callers place incoming calls to the called parties and the called parties are unable or unwilling to answer the incoming calls directly, the method being performed by a computing system of the answering service and comprising:

employing a dynamic shield to detect and respond to unwanted ("junk") calls from nuisance callers, the dynamic shield including:

a detection module that detects patterns from calls received at the answering service and, for each of one or more nuisance callers, identifies the nuisance caller from the detected patterns, a database module within which the detection module creates and stores a caller record corresponding to the identified nuisance caller, and a shield module operating with reference to the caller record in the database module to screen out further junk calls from the identified nuisance caller, the shield module operating separately and independently from the detection module and after the detection module has stored the caller record in the database module, the detection module employing information in the caller record to expire such caller record in the database module when such caller record becomes stale, the shield module for each incoming call from a caller:
obtaining an identifier for the caller;
employing the obtained identifier to index into caller records in the database module;
finding the obtained identifier in one of the caller records of the database module and thereby presuming that the call is a junk call and the caller is a nuisance caller; and
rejecting the presumed junk call and preventing the rejected call from being answered by an agent or the like, the detection module employing an algorithm that operates over a rolling window having a predetermined period of time, that considers only those call records within the rolling window that have a non-positive resolution, and that identifies a particular caller as being a nuisance caller if the particular caller appears within a set number of the considered call records.

7. The method of claim 6 wherein the call is a telephone call.

8. The method of claim 6 wherein the shield module examines each incoming call prior to answering the call and prior to billing or otherwise accounting for the call to the called party.

9. The method of claim 6 wherein the identifier for the caller is obtained from one of a caller ID service and a DNIS (Dialed Number Identification Service).

10. The method of claim 6 wherein if the shield module does not find the obtained identifier in one of the caller records of the database module, then the shield module presumes that the call is not a junk call and the caller is not a nuisance caller.

11. The method of claim 6 wherein rejecting the call includes disconnecting the call.

12. The method of claim 6 wherein rejecting the call includes instructing a telephone network supplying the call to block such call.

13. The method of claim 6 wherein the shield module updates the caller record in the database module from which the obtained identifier was found, the updating including at least one of incrementing an associated running tally of calls received from the nuisance caller, and updating a time that a most recent call was received from the nuisance caller, whereby the detection module can employ at least one of the running tally and the most recent call time to expire and delete the caller record at some later point if advisable to do so.

14. A method performed at an answering service, the answering service answering calls on behalf of called parties when callers place incoming calls to the called parties and the called parties are unable or unwilling to answer the incoming calls directly, the method being performed by a computing system of the answering service and comprising:

employing a dynamic shield to detect and respond to unwanted ("junk") calls from nuisance callers, the dynamic shield including:

a detection module that detects patterns from calls received at the answering service and, for each of one or more nuisance callers, identifies the nuisance caller from the detected patterns, a database module within which the detection module creates and stores a caller record corresponding to the identified nuisance caller, and a shield module operating with reference to the caller record in the database module to screen out further junk calls from the identified nuisance caller, the shield module operating separately and independently from the detection module and after the detection module has stored the caller record in the database module, the detection module employing information in the caller record to expire such caller record in the database module when such caller record becomes stale, the detection module:
reviewing call records to the called parties without regard to particular ones of the called parties according to at least one of an algorithm and a heuristic to detect a pattern of junk calls from a nuisance caller;
determining based on the review that a particular caller is a nuisance caller; and
creating and storing within the database module a caller record corresponding to the determined nuisance caller,
the shield module for each incoming call from a caller:
obtaining an identifier for the caller;
employing the obtained identifier to index into the caller record in the database module;

finding the obtained identifier in the caller record in the database module and thereby presuming that the call is a junk call and the caller is a nuisance caller; and rejecting the presumed junk call and preventing the rejected call from being answered by an agent or the like, the detection module employing an algorithm that operates over a rolling window having a predetermined period of time, that considers only those call records within the rolling window that have a non-positive resolution, and that identifies a particular caller as being a nuisance caller if the particular caller appears within a set number of the considered call records.

* * * * *